April 13, 1943.  P. ENDRES  2,316,230
DISPENSING SCALES WITH NEEDLES MOVING OVER SCALES AND
INSTANTANEOUSLY INDICATING THE WEIGHT IN UNITS
Filed Aug. 10, 1940

Inventor:
Peter Endres
by Bryant & Lowry
his attorneys

Patented Apr. 13, 1943

2,316,230

UNITED STATES PATENT OFFICE 2,316,230

DISPENSING SCALE WITH A NEEDLE MOVING OVER A SCALE AND INSTANTANEOUSLY INDICATING THE WEIGHT IN UNITS

Peter Endres, Cologne, Ehrenfeld, Germany; vested in the Alien Property Custodian Application August 10, 1940, Serial No. 352,156
In Germany August 23, 1939

1 Claim. (Cl. 116—129)

For avoiding the inconveniences which resulted, for instance when dosing amalgams for dental requirements, therefrom that the constituents of these amalgams were measured more or less by guessing, propositions have already been made to dose with sufficient accuracy the constituents of the mixture as regards quantity or weight by special arrangements. As regards accuracy the scales dosing according to weight are superior to the arrangements in which the constituents of the mixture are determined according to volume. The latter arrangements fail easily if the granular constituent of the mixture does not slip on uniformly.

The apparatus working on the basis of the dosing according to weight utilize the principle of the lever scales, which means that they utilize a horizontal beam resting on a knife-edge, each of the two arms of said beam carrying one or several loading bowls or cups for holding the constituents of the material to be weighed. The length proportion of the two arms, or the distance of the cups from the knife-edge is then adapted to the different weights of the constituents of the material to be mixed and to the weight of the cups or must be adapted to the same.

These apparatus work accurately but weigh only the mixing proportion and not the weight as such. It is comparatively difficult to attend them. They must be carefully tested and regulated, same as the apparatus dosing according to volume, for every new kind of amalgam or if other abnormal conditions have to be considered which may happen in the dental practice. They further require the provision of several shiftable and adjustable containers to be filled and to be mounted on separate carriers and equipped with regulating means. The cost of production and the price of the scales are thereby considerably increased. All these scales are suited each one for a special purpose and cannot be used for normal weighing such as they are so that for normal weighing separate scales must be used.

According to the invention these inconveniences are overcome thereby that only one single cup is used, destined to hold the constituents of the material to be weighed, said cup being removable and carried by a system of hinged rods and a penduling needle balancing the movement of the cup and of the system of hinged rods of this cup, by oscillating about its fulcrum and moving not only over the normal scale subdivided according to units of weight, for instance grammes, but also over an additional scale or over several additional scales. The subdivision of these additional scales differs from the normal scale in the actually desired weight proportions of the substances to be mixed the zero mark of the normal scale being always in the same position.

This inventive idea can be carried out in two forms of construction based on the one hand on the supposition that the mixing proportion of the constituents of material to be weighed may be selected as desired but must be predetermined, and on the other hand on that this mixing proportion may be varied as desired. If the mixing proportion of the material to be weighed has to remain constant, for instance $a:b:c$ and so forth, a second, third and other additional scale has to be provided, besides the scale with normal subdivision for units of weight such as grammes; the first additional scale is subdivided in the proportion $$\frac{a+b}{a}$$

the second additional scale in the proportion $$\frac{a+b+c}{a}$$

and so forth, but all additional scales are marked with figures corresponding to the normal scale and are designated if desired in different colours, type of script and the like. For mixing the constituents of the material at first the substance $a$, for instance mercury, is weighed on the gram scale up to the desired figure, whereupon the substance $b$, for instance file chips of silver, is poured into the cup and weighed up to the same figure on the first additional scale, then the substance $c$, for instance granular tin, weighed on the second additional scale again is filled into the cup up to the same figure and so forth until the weighing of the constituents to be mixed is terminated. The total weight in grammes is then shown on the normal scale.

If the mixing proportion $a:b$ has to be variable, all additional scales are subdivided in the proportion $$\frac{a+b}{a}$$

and in those steps which probably will have to be used. By shifting in the direction of the zero line of the normal scale the plate carrying the additional scales, intermediate values can be read with sufficient accuracy in such wide limits that the number of steps need not be too great.

For amalgams destined for dental purposes the mixing proportion is for kinds poor in silver between the limit values 5:4 and 5:4.7 and for kinds rich in silver between 5:6 and 5:7. Practically one scale will therefore be sufficient for all intermediate values.

An embodiment of the invention is shown by way of example in Figures 1-4 of the accompanying drawing, in which Fig. 1 shows in front elevation partly in section a pendulum scale in which a plate carrying the additional scales is arranged shiftable in vertical direction in the frame of the scales.

Figure 1:
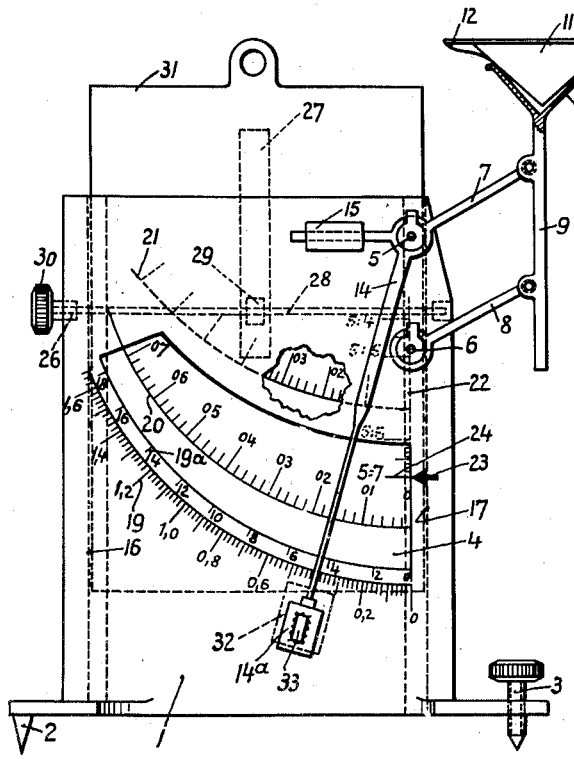

A frame plate 1 resting on a pair of stationary feet 2 and on an adjustable foot 3 has a sector-shaped aperture 4 above the normal scale 19 subdivided into units of weight such as grammes. This aperture 4, if desired, can be covered by a glass plate. On a hinge pin 5 the needle 14, from the upper end of which extends at an angle an arm 7, is pivotally mounted. On the outer end of this arm 7 a holder 9, 10 for the cup 11 destined to hold the material to be weighed is hingedly mounted. The holder 9, 10 is further hingedly mounted on the outer end of a rod 8 the inner end of which is hingedly mounted on a hinge pin 6. A horizontal rod extending from hinge pin 5 carries a slidable counterweight 15 serving to balance the weight of the hinged parallelogram and of the cup and its holder. A plate 31 is shiftably mounted in two guide ways 16, 17 of frame plate 1 and additional scales 20, 21 are engraved in this plate 31. The cup 11 is loosely mounted in the seat 10 at the top end of rod 9. A zero line 22 at the right hand end of scales 20, 21 engraved in the shiftable plate 31 has two graduations 24, 25 adapted to be adjusted on an arrow mark 23 provided on the frame plate 1. This arrow mark serves to indicate the selected mixing proportion. A rod 28 is mounted in bearing blocks 26 extending from the back of frame plate 1 and carries a pinion 29 which meshes with a rack 27 on the back of the shiftable plate 31. The rod 28 can be turned by means of a handle 30 at the end of the rod to move the shiftable plate 31 in vertical direction. If the proportion of the constituents of the substances to be mixed has to be constant, the aperture 4 and the shiftable plate 31 and also the elements for guiding and shafting said plate are not necessary. In this instance a separate scale carrier 18 can be fixed on the frame plate 1, or the scales can be engraved in the front surface of this frame plate. If however the proportion of the constituents of the mixture is variable, the desired intermediate step of this variable proportion is adjusted in that, according to Figs. 1–3, one of the lines of the transverse graduations 24, 25 is brought at the height of the arrow mark 23 on the frame plate 1. The normal scale 19 indicates then at the weighing of the first constituent of the mixture to be produced the weight of this constituent for example in tenths of a gramme and the scale 20 or 21 of graduation line adjusted to the arrow mark 23 indicate the weight of the second constituent of the mixture to be produced. At this weighing operation the needle 14 indicates on the scale 19 for the tenths of a gramme at the same time also the weight of the mixture.

Figure 3:
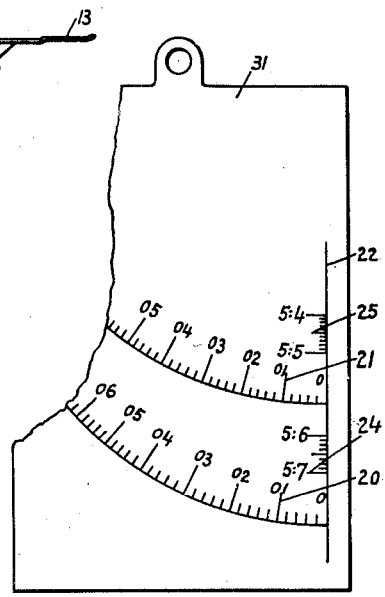
Fig. 3 shows in front elevation a fraction of the plate carrier for the additional scales.
Figure 2:
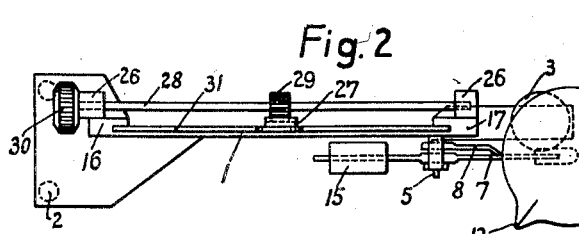
Fig. 2 is a top plan view of Fig. 1.
Figure 4:
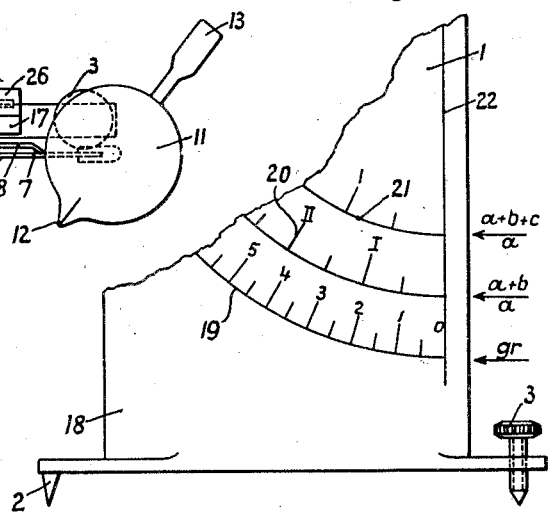
Fig. 4 shows a fraction of the front elevation of a carrier with the normal scale and with two additional scales, which carrier may be fixed on the surface of the frame and in which scales may be engraved, if the proportions of the constituents of the mixture are to be constant instead of variable.

When the arrangement according to Figs. 1 to 3 is used as scales for medicaments, gold and the like the shiftable plate 31 is either not considered at all or adjusted so that its scales 20, 21 and its graduations 24, 25 are covered by the frame plate 1. In this instance as well as when scale carrier 18 shown in Fig. 4 is used the scale 19 always indicates directly the weight in figures.

By an additional weight 32 to be hooked on a hook 33 of the end 14a of the needle 14, as shown in Fig. 1, in connection with a second scale 19a the weighing range for the weighing with direct indication of weight in figures, for instance in grammes, can be enlarged as desired. The additional weight may be constructed so that the scale 19 is partly covered by the same.

I claim:

In a scale chart for weighing scales, wherein the weighing scales include a pivoted pointer, the scale chart including a front frame plate having engraved in its front side a main scale for the main constituent of a mixture and one or more additional scales for additional constituents of the mixture, the additional scales having graduations differing from the graduation of the main scale in correspondence with the desired proportion by weight of the constituents of the mixture and having a common vertical zero line with the main scale, the frame plate having a sector-shaped aperture, a shiftable plate behind said frame plate and having engraved in its front side the additional scales for the additional constituents of the mixture, a transverse zero line displaced 90° from the direction of the zero line of the main scale, and transverse graduations, one for each additional scale visible through said sector-shaped aperture when said shiftable plate is in suitable position.

PETER ENDRES.